Nov. 22, 1955   J. L. PAINE   2,724,310
APPARATUS FOR PRODUCING TIME COORDINATED
SUCCESSIVE INDIVIDUAL RECORDS
Filed Dec. 5, 1952   2 Sheets-Sheet 1
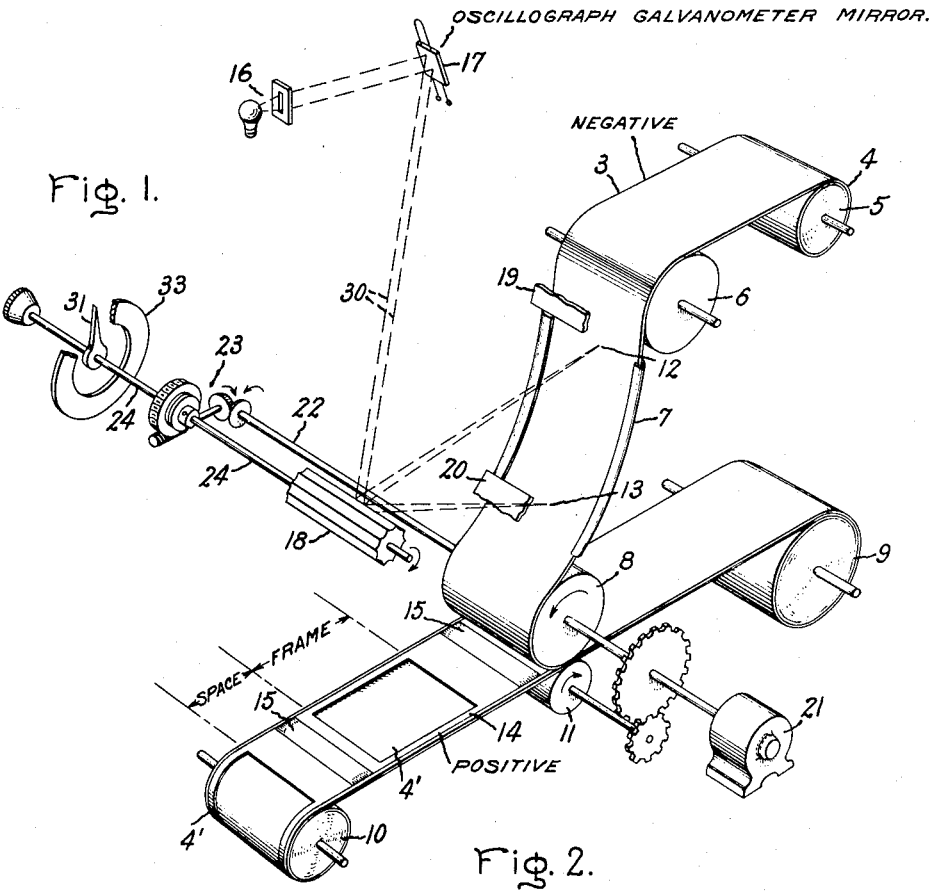
Inventor:
Joseph L. Paine,
by Russell A. Warner
His Attorney.

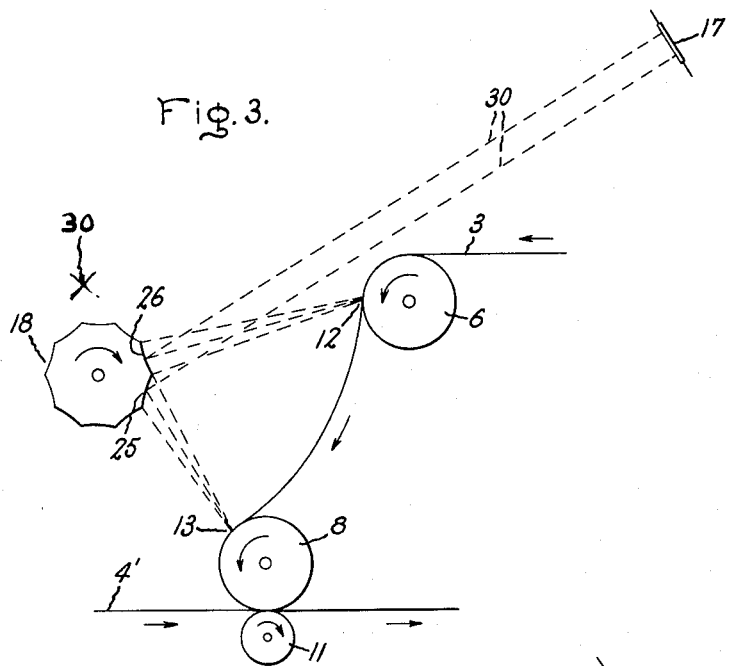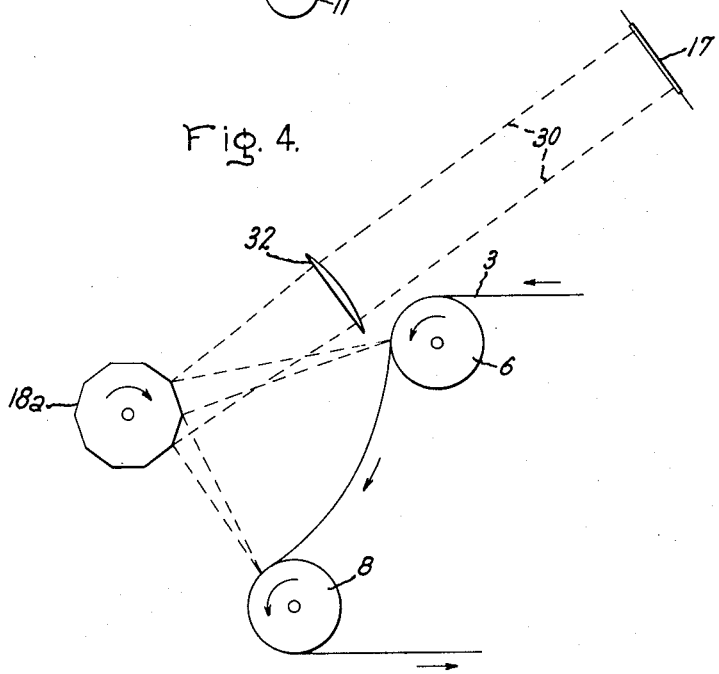

United States Patent Office 2,724,310
Patented Nov. 22, 1955

2,724,310

APPARATUS FOR PRODUCING TIME COORDINATED SUCCESSIVE INDIVIDUAL RECORDS

Joseph L. Paine, Marblehead, Mass., assignor to General Electric Company, a corporation of New York Application December 5, 1952, Serial No. 324,241

5 Claims. (Cl. 95—13)

My invention relates to an apparatus for coordinating successively produced individual records and is particularly adapted for the time coordinating of successively produced photographic records. In recent years a camera has been manufactured which in addition to the usual function of a camera also develops the negative, such that a picture or record may be taken by the camera and a developed photograph removed therefrom almost immediately, resulting in the saving of much time and the elimination of darkroom development operations. A camera of this type is known as the Polaroid Land Camera, and the film used therewith, which includes both negative and positive films and a developer, is known as the Polaroid Land Film. Such photographic film may be and is referred to herein for convenience as self-developer film. Such photographic self-developer film is available in the multiple exposure type, such that different photographs may be taken on successive portions of the film without camera reloading. My invention is particularly useful for the time coordinating of the records taken on multiple exposure self-developer films.

In multiple exposure film of the self-developer type spaces are left between successive exposure portions. The exposure portions on which photographic records are made are herein referred to as frames. Hence, if the film were advanced continuously and the transverse movement of a beam of light or other image were photographed thereon, the record would be discontinuous, and the records produced on successive frames would not be time coordinated because of the time and record lost during the movement of the film over the spaces between frames. In accordance with my invention the beam of light or other light image to be recorded is segregated into time zones equal in duration to the time of passage of one frame plus one space distance past the recording or exposure area, and the image is also swept in the direction of movement of the film at a rate such that the complete phenomenon occurring during a time zone is recorded on a frame. Hence, if the exposed frame portions of the film are then cut out and placed together end to end so as to eliminate the space portions, a true time coordinated record would result. These recording results may be accomplished with the aid of multiple mirror drums rotated in the proper direction and at the proper speed and synchronized with the movement of the film, as will be described. In this way I am able to obtain long-time continuous records analogous to those produced on continuously photosensitive moving film by galvanometer oscillographs but without the necessity of taking the film to a darkroom and developing the film.

The features of my invention which are believed to be novel and patentable will be pointed out in the claims appended hereto. For a better understanding of my invention reference is made in the following description to the accompanying drawing which shows in Fig. 1 a perspective view of a preferred embodiment of my invention as applied for obtaining time coordinated complete records using a film of the self-developing multiple exposure type, Fig. 2 is a diagrammatic representation of the multiple mirror drum and negative film which will be referred to in explaining the time coordination of spaced records, Fig. 3 is an end view of the film feed rolls and light ray system showing a suitable geometrical relationship and Fig. 4 is a modification using a plane mirror drum.

Referring to the drawing, 3 represents the negative sheet section and 4' the positive sheet section of the self-developing multiple exposure type of photo-sensitive film as arranged for use according to my invention. The negative sheet is drawn from roll 4 on a spool at 5 over a guide roll 6 through a curved guide chute 7 over the feed roller 8 to the reroll spool at 9.

The positive sheet is drawn from a supply roll on a spool at 10, passes between the roller 8 and a roller 11 to the reroll spool 9. It is noted that the positive and negative sheet sections join and are pressed together between rollers 8 and 11 and then continue as a single composite film to the reroll spool at 9. During the passage of the negative sheet 3 over the guide at 7 its upper surface, as there shown, is exposed to light beams indicated at 12 and 13. Thus that portion of the negative sheet between the points where light beams 12 and 13 strike the same is the exposure area. It is noted that the exposure side of the negative sheet becomes the lower side of such sheet as it passes around and beneath roller 8, and hence, is brought into contact with the upper side of positive sheet 4'. The make-up of sheet 4' includes a full width supporting web 14, the positive frame portions 4' slightly narrower than the web 14, and developer sacks located at 15 in the spacer between frames. The positive frame parts 4' are of uniform length and are uniformly spaced apart along the length of the positive sheet. The developer sacks are small, elongated, easily broken, paperlike containers extending crosswise of the web 14 and secured in place on the web in the spaces between frames.

When the positive sheet passes between rollers 8 and 11, the developer sacks or pods are broken and the developer material in a sack is squeezed and spread out between the negative sheet 3 and the positive frame 4' which immediately follows the ruptured sack through the rolls. The nature of the positive and negative film portions and the developer is such that any light image record made on the negative sheet 3 during the exposure and placed in intimate contact with the positive frame in the presence of the developer by rollers 8 and 11 is reproduced on the positive frame as a fully developed photograph within about one minute, and such photographs may be removed from the web 14 at roll 9. The photographic development aspects of the self-developing film are not a part of my invention. It is to be understood that the apparatus will be enclosed in a light-tight box or housing, not shown, to the extent necessary to prevent premature undesirable exposure of light sensitive materials.

At 16 is a light source projector which projects a narrow beam of light onto a galvanometer mirror at 17. The mirror at 17 reflects the narrow beam of light onto a drum 18, the outer surface of which is made up of a plurality of mirrors, the drum having a cross section resembling an equilateral polygon except that the individual sides of the polygon are slightly concave in the modification illustrated in the drawing Figs. 1, 2 and 3. The axis of the mirror drum 18 is parallel to the axes of rollers 6 and 8, and the light beam strikes the drum surface on the side towards the negative film part 3 at such an angle that the beam will be reflected to 3 somewhere in the exposure zone between the limits indicated by rays 12 and 13, depending upon the rotary position of the drum. Screens at 19 and 20, or other means, are provided as necessary to prevent the beam from striking the negative 3 beyond the desired exposure zone, and these screens may be made adjustable for final calibration purposes. The mirror drum 18 is rotated in synchronism with the advance of the self-developer film parts by having the necessary rotating parts connected to the same driving means. In some cases this driving means might be a hand crank but a constant speed motor is to be preferred, and at 21 I have indicated a driving motor for driving the shaft 22 of drum 8, and through gearing at 23 the shaft 24 of mirror drum 18. The mirror drum 18 is rotated in such direction that as rotated it moves the beam of light reflected from its surface in the same direction as the negative film part 3 is advanced past the exposure zone. The geometry of the light ray system (see Fig. 3) is such that at the instant one beam of light 13 from one mirror surface 25 (Fig. 2) reaches the exit limit of the exposure zone, a second beam of light 12 from the next succeeding mirror surface 26 enters the entrance limit of the exposure zone. As the mirror drum rotates, the light beam at 12 sweeps downward in Fig. 1 and to the right in Fig. 2 until it reaches the position 13 where its exposure function ends. The relative speeds of rotation of film drum 8 and mirror drum 18 are such that as the film 3 moves the distance of one frame plus one space between frames, a light beam moves the distance of one space on film 3. Thus, in Fig. 2, as the light beam moves from position 12 to position 13 over the recording or exposure zone corresponding to the length of the space between frames, the point 28 of the film moves to a position 29, and the negative for a frame II shown to the left of the recording zone moves to the position of the negative for a frame I shown to the right of the recording zone a distance equal to the length of a frame plus a space. The ray leaving at 13, Fig. 2, has just completed the exposure for frame I, and the ray entering at 12 is just about to start exposing for frame II, and if a sine wave measurement is influencing the galvanometer mirror at 17 moving the light beam 30 axially of the mirror and the exposure ray crosswise of the film, a sine wave exposure trace 32 will have been made for frame I as indicated by the solid line curve and is about to be continued for frame II as indicated by the dark line curve. These records are transferred to the positive frame material by the development process and if after such development, the frame records are removed from the remainder of the film material and placed end to end in the order indicated in Fig. 2, it will be found that the end of the record of frame I will exactly match the beginning of the record of frame II because these points of the two records were made at the same instant of time and the records are thus time coordinated.

When thus placed together, the two frames give an accurate time coordinated continuous record of the galvanometer measurement over the complete recording time for the two frames. No record or recording time is lost and there is no confusing overlap, although overlap can be arranged for should that be desirable. The mirror 17 of the galvanometer is represented as being mounted on suspension conductor wires corresponding to the mirror mounting of a common form of galvanometer oscillograph and is thus intended to represent such an instrument.

The length of the linelike light beam 30 should be sufficient and at right angles to the axis of the mirror drum so that when it strikes the mirror drum, it will reach from one individual mirror to the next in order that one mirror 24, Fig. 2, will still be projecting the beam at 13 by the time the next mirror 26 starts to project the beam at 12. Any extra beam length that would be reflected beyond the limits of the exposure zone may be cut off by the shields 19 and 20. The curvature of the individual mirrors of the mirror drum and their distance from the negative film 3 in the exposure zone are such that the linelike beam striking the mirrors is reflected as a point of light by the time it strikes the negative. Hence, a sharp, narrow exposure beam is obtained.

Another precaution should be taken to make the geometry of the light ray exposure system such that there is no time distortion between different parts of the record on the same recording frame. This is assured if the rate of travel of the exposure beam relative to the negative film lengthwise of the film is made uniform in the exposure zone and since the speeds of the film feed roller 8 and the mirror drum 18 are always proportional, this is not difficult.

I will now give some practicable dimensions for the apparatus suitable for carrying out the invention. One standard self-developing film has frames $3^{13}/_{16}$ inches long and $2^{29}/_{32}$ inches wide with the space between frames $2^{5}/_{8}$ inches. The rate of travel of the film and the speed of rotation of the mirror drum 18 will depend somewhat on the nature of the measurement or other phenomenon to be recorded. Typical examples are as follows:

| Mirror Drum, R. P. M. | Film Travel, Feet Per Second |
| --- | --- |
| .183 | 1 |
| 1.83 | 10 |
| 9.14 | 50 |
| 18.3 | 100 |

If we assume that the film is driven by a motor driven roller at 8 of 0.95-inch diameter (3-inch circumference), the gear reduction ratio between the roller shaft and drum should be 21.9 using a mirror drum 18 one inch in diameter having ten evenly spaced concave mirrors, and using a geometrical relation of parts as shown in Fig. 3. Assuming a distance of 10 inches between mirror drum axis and galvanometer mirror, the mirror drum may be three inches long and its concave mirrors made $1/4$ inch wide with a radius of curvature of four inches. The distance from the center of the active mirror to the film varies from $2^{1}/_{2}$ inches at the start of the exposure zone to $1^{3}/_{4}$ inches at the end of the exposure zone.

For the setup shown in Fig. 3 the negative film chute 7 in the exposure zone will conform to the inside surface of a cylinder the axis of which is at point 30 above the mirror drum 18, since the light from the galvanometer mirror at 17 strikes the drum from above. The film chute 7 has grooved track edges to retain the film at the proper curvature. The geometrical arrangement represented in Fig. 3 will cause the light beam at 12 to move to point 13 the exposure zone distance of $2^{5}/_{8}$ inches measured on the surface of the film 3 while the film 3 is moving a distance of $3^{13}/_{16}$ inches (length of a frame) $+2^{5}/_{8}$ inches (space between frames) $= 6^{7}/_{16}$ inches. Also the rate of travel of the light beam at the film in the exposure zone will be linearly proportional to the rate of travel of such film so as to produce undistorted records. Other arrangements and speed relations of the parts which will accomplish these results for the particular film frame and space dimensions given may be used. Likewise appropriate variations may be made to accommodate film material having other frame and space dimensions without departing from my invention.

The cylindrical polygon-sided mirror drum instead of having slightly concave mirrors could have plane mirrors, if we use the proper lens between the light source and mirror drum as represented in Fig. 4. A polygon mirror drum, the 10 sides being plane mirrors, is shown at 18a, and the light rays from the galvanometer thereto passes through a plano-convex cylindrical lens 32 of 2.38 focal length such that the line of rays which strikes a given mirror of the drum at different peripheral positions across its face does so at slightly different angles such that the rays are reflected to a point at the negative film in the exposure zone. The geometry of the setup is otherwise generally similar to Fig. 3 and for such set up the lens 32 should be $1^{3}/_{4}$ inches from the axis of rotation of mirror drum 18a.

When the film is loaded into the camera it is necessary that attention be given to the relative position of a positive frame part 4 and the rotary position of the mirror drum 18 so that the exposure which is made for a frame in the exposure zone will coincide or match up with a positive frame when the two meet between the rollers 8 and 11. One way of doing this is to feed the film into the rolls until the first frame 4 is in a certain known position with respect to the drum conveyor system and then adjust the rotary position of mirror drum 18 to correspond. The connection between the gear at 23 on the mirror drum shaft may be a friction clutch connection for this purpose, and the shaft 24 may be extended to the outside of the casing and have a pointer 31 thereon indicating with respect to a stationary setting scale 32. Any other convenient setting arrangement or provision may be used. Where the frame and space between frame relationship is different from that previously specified, the geometry of the exposure system would need to be altered to correspond in accordance with the principles described.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Photographic apparatus of the self-developer film type, comprising means for simultaneously and continuously advancing separated negative and positive film sheets of the multiple frame self-developer type at the same rate and into development contact with each other, said means comprising rolls for passing the negative film through an exposure zone before it is advanced into contact with the positive sheet, means for exposing the negative film to an image while passing through the exposure zone, said means including a multiple faced mirror drum which is rotated at a rate proportional to the advance of the film, a mirror on said drum serving to reflect the image onto the negative film in the exposure zone while advancing the exposure image along the film in the direction of its travel but at a slower rate whereby a length of negative film corresponding to a frame length is exposed to the image and a length of negative film corresponding to the distance between frames remains unexposed, the design and location of said drum being such that successive mirrors thereon reflect successively timed portions of the image onto following frame length portions of the negative film as they pass through the exposure zone with the exposed portions of such film separated from each other by unexposed portions corresponding to the distance between frames, the image as reflected from one mirror starting to expose a film section not later than the image as reflected from another mirror has discontinued exposure of the preceding film section.

2. In photographic apparatus of the type which uses self-developer film having positive and negative film sections and where the positive film has uniformly spaced positive frame sections, rolls for advancing the negative film through an exposure zone before it moves into development contact with the positive film, a multiple faced mirror drum adjacent to such exposure zone for reflecting successively timed portions of the image to be recorded onto the negative film within the exposure zone during consecutive mirror exposure time intervals, means for simultaneously and continuously driving said drum and advancing the film at proportional rates of speed, such that the image from a mirror is advanced in the same direction as, but at a slower rate than, the film within the recording zone, the geometry of the reflecting system being such that the relative rate of movement of film and exposure image is uniform and such that a length of film corresponding to a frame length is exposed and a length of film corresponding to the spacing between frames remains unexposed during each such mirror exposure time interval, said mirror drum being designed in relation to the position, length and curvature of that portion of the film within the exposure zone so that as one mirror is finishing exposure on one frame length portion of the film, another mirror is starting exposure of a following frame length portion of the film, such exposed film portions being separated by a distance corresponding to the frame spacing, and means for advancing the positive film into development contact with the negative film after such exposure with the exposed negative film portions matching the positive frame film portions.

3. Photographic recording apparatus comprising a mirror type galvanometer, a camera of the type which employs self-developer film having a negative sheet and a sheet having uniformly spaced apart positive frame sections, rolls for supporting and advancing the two sheets including rolls for advancing the negative sheet through a recording zone and rolls for advancing the positive sheet into development contact with the negative sheet after exposure of the latter, a rotary drum the surface of which is divided into a plurality of similar mirror faces for reflecting light from the galvanometer mirror onto the negative film when in the exposure zone, a light source for said light ray recording system, common means for driving said rolls and mirror drum in unison and at fixed relative rates of speed, the measurement movement of said galvanometer causing the recording light image to move crosswise of the negative film and the rotary movement of said drum causing the recording light image to be advanced in the same direction as the negative film movement within the recording zone and at a rate such that the negative film is exposed by one drum mirror over the distance of a frame length while moving such distance plus the positive frame spacing distance, the number of mirror faces on said drum being such that as one mirror finishes recording at one end of the recording zone the next mirror simultaneously starts recording at the other end of the recording zone on the next succeeding frame and at a distance apart along the negative film equal to the spacing between positive frames.

4. Photograph recording apparatus, including a camera of the type employing self-developer film having a negative sheet and a sheet having uniformly spaced apart positive frame sections, sheet supporting and advancing means including rolls and guides for passing the negative film through an exposure zone, and for advancing the negative and positive frame sheets into developing contact after the negative sheet has been exposed, a light source, a galvanometer mirror receiving light from said source, a multiple faced mirror drum receiving reflected light from said mirror and reflecting it onto the negative sheet within the exposure zone, movement of the galvanometer mirror causing the recording ray to move crosswise of the negative sheet, common driving means for driving the rolls and the mirror drum in a fixed speed relation, rotation of the mirror drum causing a recording ray to be swept lengthwise along the negative sheet in the direction of the sheet movement within the exposure zone a distance corresponding to the spacing between frames of the positive frame sheet during the time that such sheet is being advanced such distance plus the length of a frame, consecutive faces of said mirror drum progressively producing consecutively timed exposures of different frame length sections of the negative sheet, such sections being spaced apart the same as the positive frame section spacing, and means for adjusting the relation between the advancing position of the positive frame sheet and rotary position of said mirror drum whereby recording ceases on one frame and substantially simultaneously starts on the next successive frame yielding continuity in time between successive frames.

5. Photographic apparatus for producing time coordinated records, on the several frames of a multiple frame self-developer type photographic film, such film comprising a negative sheet and a positive frame sheet where the positive frames are separated from each other by equal spaces occupied by pads containing developer material, comprising rolls and guides for advancing the negative film through an exposure zone and for advancing the exposed negative sheet and the positive frame sheet into development contact, means for advancing said sheets in unison, an instrument the operation of which is to be recorded, a light ray reflecting system influenced by the operation of said instrument positioned and synchronized with the advance of the film sheets for recording by exposure the continuous operation of said instrument on consecutive spaced apart frame length portions of the negative sheet, such exposure occurring on the negative sheet when passing through the exposure zone and the spaces between the exposed negative sheet portions being equal to the spaces between positive frames, and means for adjusting the synchronized relation between the light ray reflecting system and the advance of the positive frame sheet so that the positive frames will match with the exposed portions of the negative sheet when in development contact yielding a continuous, time coordinated, record.

References Cited in the file of this patent

UNITED STATES PATENTS

| | | |
|---|---|---|
| 2,060,963 | Degrift | Nov. 17, 1936 |
| 2,446,668 | Tuttle | Aug. 10, 1948 |
| 2,572,357 | Land | Oct. 23, 1951 |
| 2,582,001 | Bornemann | Jan. 8, 1952 |